United States Patent
Testin

(10) Patent No.: US 6,838,861 B2
(45) Date of Patent: Jan. 4, 2005

(54) PARALLEL COUPLED STANDBY POWER SUPPLIES PROVIDING PLURAL OUTPUTS

(75) Inventor: William John Testin, Indianapolis, IN (US)

(73) Assignee: Thomson Licensing, S.A., Boulogne-Billancourt (FR)

(*) Notice: Subject to any disclaimer, the term of this patent is extended or adjusted under 35 U.S.C. 154(b) by 0 days.

(21) Appl. No.: 09/739,198

(22) Filed: Dec. 18, 2000

(65) Prior Publication Data

US 2002/0024327 A1 Feb. 28, 2002

Related U.S. Application Data

(60) Provisional application No. 60/208,859, filed on Jun. 2, 2000.

(51) Int. Cl.[7] .............................................. G05F 1/577
(52) U.S. Cl. ...................................... 323/267; 323/269
(58) Field of Search ............................... 323/267, 269, 323/272

(56) References Cited

U.S. PATENT DOCUMENTS

| | | | | |
|---|---|---|---|---|
| 4,189,670 A | * | 2/1980 | Tanahashi | 323/269 |
| 4,636,709 A | * | 1/1987 | Ohsawa | 323/267 |
| 4,644,251 A | * | 2/1987 | Rathke | 323/267 |
| 5,036,261 A | * | 7/1991 | Testin | 315/411 |
| 5,353,215 A | * | 10/1994 | Dinwiddie et al. | 363/65 |
| 5,387,822 A | * | 2/1995 | Martin-Lopez et al. | 323/280 |
| 5,412,308 A | * | 5/1995 | Brown | 323/267 |
| 5,721,675 A | * | 2/1998 | Lee | 363/44 |
| 5,886,508 A | * | 3/1999 | Jutras | 323/267 |
| 6,107,786 A | * | 8/2000 | Brown | 323/283 |
| 6,201,374 B1 | * | 3/2001 | Ater et al. | 323/267 |
| 6,204,650 B1 | * | 3/2001 | Shimamori | 323/267 |
| 6,433,521 B1 | * | 8/2002 | Chen et al. | 323/267 |
| 2001/0011844 A1 | | 8/2001 | Ernst et al. | 307/64 |

FOREIGN PATENT DOCUMENTS

| | | | | |
|---|---|---|---|---|
| DE | 4025457 | | 2/1991 | H04N/5/63 |
| DE | 19639644 | | 4/1998 | H02J/9/06 |
| GB | 2000340 | | 1/1979 | G05F/1/46 |

OTHER PUBLICATIONS

"Programmable Precision References", TL431, A, B Series, pp. 1, 2 and 8, Mar. 2001, ON Semiconductor.

* cited by examiner

*Primary Examiner*—Jeffrey Sterrett
(74) *Attorney, Agent, or Firm*—Joseph S. Tripoli; Joseph J. Laks; Daniel E. Sragow

(57) ABSTRACT

A power supply for a television apparatus comprises a source of energizing potential (5.2V) fed to first and second control transistors (Q26403, Q26404). The first control transistor outputs a first source, while the second control transistor outputs a second source. The two control transistors are controlled by a feedback type voltage regulator (U26404) so that the sources track each other. The feedback voltage regulator is controlled by the second source. A storage capacitor (C26466) is coupled to the first source through an isolating resistor (R26462).

3 Claims, 1 Drawing Sheet

PARALLEL COUPLED STANDBY POWER SUPPLIES PROVIDING PLURAL OUTPUTS

This application claims priority from U.S. Provisional Application No. 60/208,859 filed 2 Jun. 2000.

BACKGROUND OF THE INVENTION

The invention relates to a power supply for television apparatus and the like, in which two sources are provided. The regulation circuits of the two sources are coupled so the sources accurately track each other, and thereby ensures that signal lines and the like driven from circuits on one of the two sources remain at levels that are within specifications for circuits on the other of the two sources.

Televisions, video recorders and the like, herein generally termed television apparatus, often include circuits which must remain energized when the television apparatus is turned off, i.e., not producing a raster display. For example, instant-on circuits, clocks and timers, remote controls having on/off power switching capability, sophisticated control or tuning functions, digital memories and the like, may all need to be powered continuously. Typically, these elements are powered so long as the television apparatus is coupled to energized AC mains, and optionally for a further limited time by a battery.

In the run mode, the television apparatus can be powered from the horizontal deflection circuits and the flyback transformer, operative during horizontal scanning. A standby power supply is provided for powering the standby loads when not scanning, i.e., when in standby. It is also possible to employ a switched mode power supply, which preferably operates at the horizontal rate in the run mode, and is free running in standby. The switched mode power supply can be switched between operation in run and in standby, to accommodate different current requirements as well as to disable certain voltage outputs when in the standby mode, namely those coupled to the run loads.

Typically the standby supply has a transformer with a primary winding which is non-switchably coupled to the power plug of the apparatus, and a secondary winding coupled to the input terminals of a rectifier such as a full wave bridge. The output terminals of the rectifier are coupled to a storage or filter capacitor which is charged to an unregulated voltage level related to the AC mains voltage by the turns ratio of the transformer. A voltage regulator is coupled to the filter capacitor and regulates the supply voltage applied to those loads which are to remain constantly powered, i.e., the standby loads.

The standby loads typically are control circuits and may include integrated circuits (ICs) such as microprocessors, random access memories and the like. A remote control receiver may be provided to monitor constantly for a startup signal, for switching from the standby mode to th run mod. It is possible to deactivate the standby power supply or to block all or part of the current from the standby power supply when switching into the run mode. Many television apparatus, however, use the standby power supply to power the standby loads when in the run mode as well as in the standby mode. In that case, the run mode loads (i.e., the loads which are not powered in standby) are powered by one or more separate power supplies, for example from the switched mode power supply associated with the horizontal deflection circuits.

In some applications, large amounts of data can be stored in memory devices such as a SDRAM. This data can be generated from a variety of sources. TV program data may be collected over a several hour period several times a day. In order to prevent the data from being unavailable to the customer for several hours after AC power is lost, it is desirable to store the data in memory for a long enough period to cover typical AC line dropouts.

Providing different power supplies for some of the control circuits than for others causes a problem because the separately powered control circuits are coupled to one another. The digital control circuits used in normal operation may share the memory used for data retention and they must communicate with one another over common signal lines when in normal operation. It is necessary to cause the digital and memory retention regulated voltages to remain substantially equal. However, this can be a complicated problem because the loading of the digital and data memory supplies varies greatly and the fact that the data memory supply must remain essentially regulated even though the digital supply drops to zero.

One supply, for example at 5 VDC, may need to supply only 40 mA of current. The second supply at the same voltage may need to supply current up to 1 A. A fundamental problem with known schemes for maintaining equal regulated voltages for both supplies is that variations in the base-emitter voltage of the regulating transistor of the run supply is on the order of 200 mV.

Control circuits such as CMOS integrated circuits are suitable for fast switching characteristics and reliable long term performance. Large scale integration of CMOS circuits, and in particular microprocessor control of television apparatus, is used widely. It is a characteristic of CMOS circuits that where commonly connected circuits are powered from different power supplies, the voltage regulation of the respective supplies becomes critical. A problem known as SCR latching can be caused by exceeding the tolerance of a CMOS circuit for differences between the VDD supply for the IC and the maximum voltage applied to the inputs of the is SCR latching can occur because the supply voltage coupled to a first IC in a common communication path produces a signal on its output that exceeds the supply voltage coupled to a second IC having an input coupled to the output of the first IC. This problem is discussed, for example, in U.S. Pat. No. 5,036,261 to Testin.

U.S. Pat. No. 5,036,261 to Testin recognizes the problem of variations between two supply voltages which power different integrated circuits whose signal lines are coupled. The problem is addressed by providing only one voltage regulator, to which the unregulated run and standby voltages are coupled at a summing junction. A common supply voltage is thereby obtained, and in the run mode powers both the run and standby loads at the same voltage. Switching means are provided to decouple the run mode loads from the regulator when in standby. The unregulated run supply voltage is derived from the horizontal deflection circuits and is higher than the unregulated standby supply voltage. The unregulated run supply voltage is coupled to the summing junction by a diode which is forward biased in the run mode and reverse biased in standby. The run supply effectively overpowers the standby supply when in the run mode, and as a result, the run supply takes over for supplying power to the standby loads (in addition to the run loads) when horizontal deflection commences.

It is possible to couple ICs which operate at different reference voltages via level shifting circuits. However, it is more desirable to directly couple the respective outputs and inputs, and to use the same reference voltage to power the ICs. A circuit with some ICs coupled to the standby supply and others coupled to the run supply, wherein respective input and output signal lines are coupled, for example, over a communications bus, needs some provision to ensure that the supply voltages are equal.

Most CMOS integrated circuits in production specify a maximum input pin voltage of VDD+0.3 V, to guarantee that the integrated circuits will operate as specified. At greater than VDD+0.3 V, unguarded flip/flops, RAM cells and other integrated functions may change state and cause anomalous operation, or an SCR latch may occur which blocks further operation of the affected circuit until the power is turned off.

Unfortunately, variations in components and conditions are such that the typical voltage regulator cannot be expected to match the nominal output voltage, or even if made manually adjustable by a potentiometer or the like, indefinitely to maintain the nominal output voltage to the required tolerance. A typical series regulator uses a series power transistor having a collector coupled to the unregulated voltage input, and a base coupled to a reverse biased Zener diode and by a resistor to the unregulated input. The voltage across the Zener diode defines a reference that in conjunction with the base-emitter voltage drop determines the regulated output voltage on the emitter of the power transistor. Assuming two CMOS integrated circuits driven respectively from a 5 V run supply and a 5 V standby supply, and assuming that both have Zener diodes of 5% tolerance, one of the supplies may regulate to 5.25 V and the other to 4.75 V. The difference, namely 0.5 V, is enough to violate the VDD+0.3 V maximum input voltage rule.

It is possible to use the regulated level of one power supply to affect the regulation of another power supply. Circuits of this type may require potentiometers to set the coupling between the supplies when the apparatus incorporating the supplies is manufactured. Potentiometers can be expensive. Furthermore, the optimal relationship between the two regulators may be affected by the current loading of one supply or the other. Where the current loading of a series regulated supply is increased, the base-emitter voltage of the series pass transistor in the regulator increases. The loading thus produces a load-dependent variation between the emitter voltage (i.e., the regulated output) and the base of the series pass transistor, which typically is coupled to a reference voltage element.

When temperature drift tolerance as well as the Zener nominal tolerance are factored together, each of the regulated supply voltages easily can vary by ten percent. Using the nominal 5 V supply voltage example, an input to a CMOS circuit coupled to the lower supply voltage, driven by an output from a CMOS circuit coupled to the higher supply voltage, could exceed the lower VDD by one volt (With one supply at −10%×5V=−0.5V and the second at +10%×5V=+0.5V the difference is 1V. ) When one further considers the variations resulting from loading-induced variations in the base-emitter voltage of the run supply regulator, anomalous operation or a potential SCR latch becomes quite a problem.

The use of tracking run and standby power supplies for energizing CMOS integrated circuits to avoid SCR latching when the standby power supply remains active during run, is known from U.S. Pat. No. 5,353,215, issued 4 Oct. 1994 to Dinwiddie et al.

The Gemstar On Screen TV Guide gathers data during the vertical blanking interval over a 2–4 hr. period 4 times a day. If there is a loss of AC power, the consumer must wait for the next download, which may be several hours after a 15 minute or less dropout, a means of economically saving the data is required.

SUMMARY OF THE INVENTION

The present invention involves two standby supplies, one of which is used for (relatively) long term data retention. Expanding on the original shared regulator for a run and standby supply, the current invention allows the components of the shared regulator to not only force the two independent supplies to closely track, but to use one of the regulators as an isolating means to limit the current drawn from the memory capacitor. The invention solves many of the standard problems found in coupled supplies such as: 1) base-emitter breakdown on the transistor for the supply that goes to zero volts when AC is first removed, 2) the loss of regulation of the remaining supply after the first supply decays, 3) the loading of the memory supply by the components of the regulator, and 4) base resistors to prevent the regulator transistors from oscillating when driving capacitive loads.

The combination of an SDRAM IC with a "self-refresh mode" and a "supercap" provide this economical means. In order to minimize the loading on the supercap (which is comparable to a 0.22 farad electrolytic capacitor), the microprocessor and the ROM are powered from a separate supply. In order to allow communication to the SDRAM on a bus that is shared with the ROM and the Gemstar4 integrated circuit, the supplies for the SDRAM and the ROM/Gemstar4 integrated circuit must track within 0.3 V to meet the integrated circuit specifications.

The necessary close tracking is provided by the inventive arrangements. The inventive arrangements can be embodied in a low-cost 3.3 V tracking supply with high isolation. A TL431 regulator drives two series pass regulators from the same reference. The two "matched" series pass regulators, driven from the same reference, allow the supplies to track with the 0.3 V requirement over varying load and temperature.

According to an aspect of the invention, two power supplies provide first and second sources of power, such as digital (or standard) and memory retention standby power. First controllable means are coupled to a source of energizing potential for providing the first source of power. Second controllable means are coupled to the source of energizing potential for providing the second source of power. A reference source is coupled to the control terminal of each of the controllable means. A storage capacitor is coupled to the first source of power through a resistor.

According to another aspect of the invention, a power supply provides first and second sources of power. First controllable means are coupled to a source of energizing potential for providing the first source of power. Second controllable means are coupled to the source of energizing potential, for providing the second source of power. A reference source is coupled to the control terminal of each of the controllable means. The reference source is a feedback-type of voltage regulator.

DESCRIPTION OF THE DRAWING

The sole FIGURE of drawing is a schematic diagram of a circuit according to a preferred embodiment of the invention.

DETAILED DESCRIPTION

Figure 1:
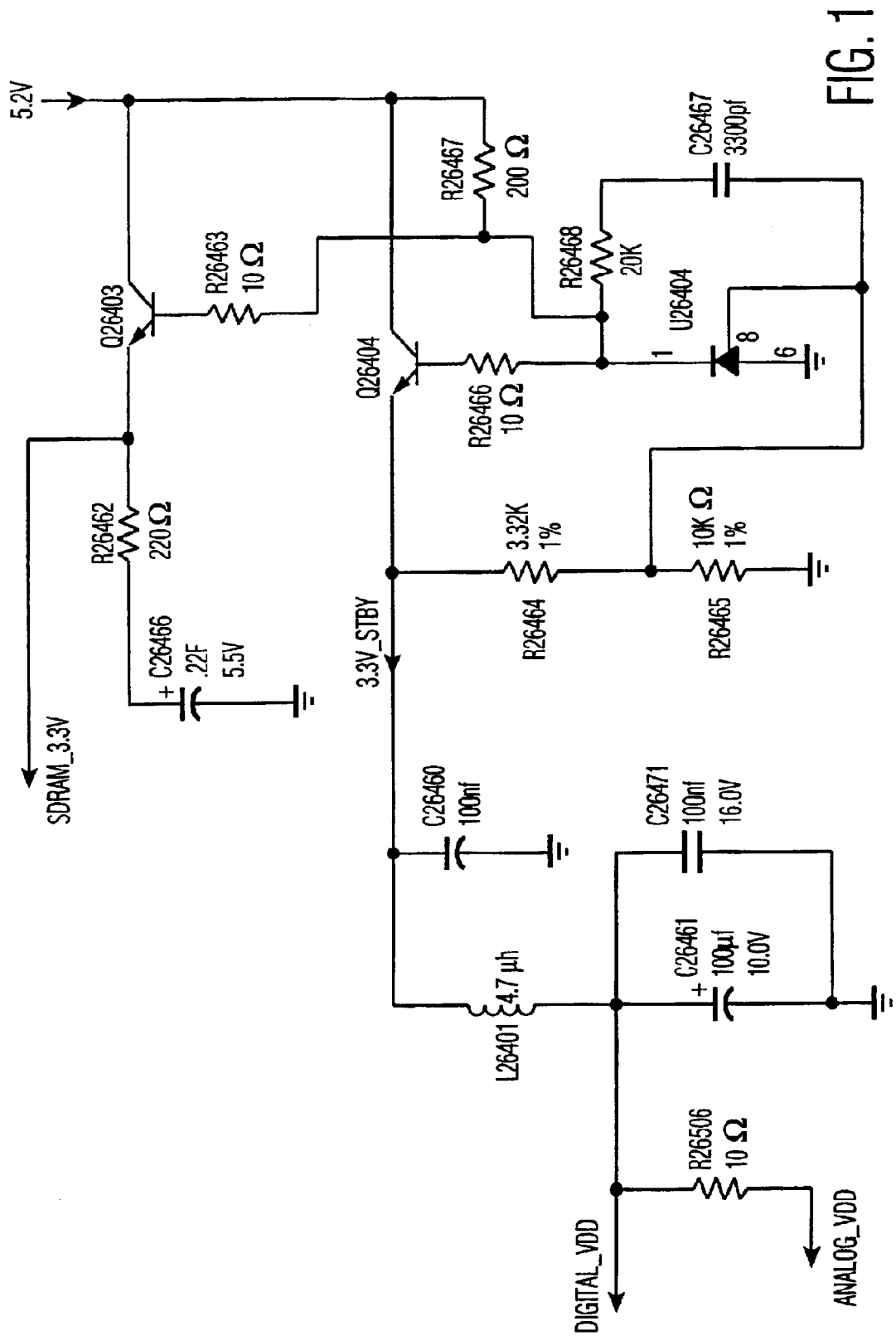

The schematic in the FIGURE illustrates an embodiment of a tracking or feedback regulator in accordance with the invention. Component U26404 is a TL431 regulator. Resistors R26454 and R26455 divide a 3.3V_STBY supply down to 2.5 V. The 2.5 V is fed into the TL431, which has a comparator referenced to the 2.5 V. The output of the TL431 is an open collector. When the input to the TL431 exceeds 2.5V, the base drive for transistors Q26403 and Q26404 (which is supplied from resistor R26467) is removed. When the input drops below 2.5 V, the base drive is restored. The two 10 ohm resistors R26243 and R26466 in the bases of the two transistors Q26403 and Q26404 prevent possible oscillations. With both bases driven from the same reference, the emitter voltages will match one another, except for the difference in base current through the 10 ohm resistors, the difference in base-emitter voltage and the intrinsic base impedance. With current variations of less than 100 mA between the two integrated circuits, and a base-emitter drop of less than 100 mV under those conditions, the output voltage tracks closely, typically within 100 mV.

The 3.3V-standby supply is fed to a low pass filter, which supplies low ripple voltages Digital VDD and Analog VDD to appropriate portions of the circuitry which require energization during the standby mode. Capacitor C26160 and inductor L26401 act as a low pass L-C filter. Parallel coupled capacitors C26461 and C26471 further remote ripple, capacitor C26461 removing low frequency ripple, while capacitor C26471 removing high frequency ripple.

An ATE (automatic test equipment) test was performed at the module level. The ATE test insured that the current in self-refresh mode remained within spec. With the proposed configuration, excellent isolation was obtained between the SDRAM supply, which must be maintained for 15 minutes with SDRAM parts that have a maximum current draw in self-refresh mode of 2 mA, and the 3.3 V STBY supply for the micro which falls in 100 msec or less.

Regulator U26404 is advantageously connected to the 3.3 V STBY supply rather than to the SDRAM 3.3 V supply to eliminate the leakage from the resistor divider used by the TL431. The way the regulator is configured, when the AC mains supply is removed, the 5.2 V supply into the regulator starts to drop. When the base drive drops below 3.9 V (3.3 V plus a 0.6 V base-emitter drop), resistor R26467 can no longer supply base drive to either transistor Q26403 or Q26404. At that point, the TL431 is out of the circuit. With the base-emitter junctions of transistors Q26404 and Q26403 no longer forward biased, both transistors turn off. Due to the supercap, C26466, the base-emitter junction of transistor Q26403 is reverse biased. The base-emitter junction does not undergo Zener breakdown until the voltage is greater than 5 V, so Zener breakdown is not a problem.

Resistor R26462 ensures that when the instrument is initially energized, the SDRAM will receive the full 3.3 V supply while the supercap C26466 is charging. Typically, due to the impedance in the charging path, the supercap requires about 6 minutes to fully charge.

What is claimed is:

1. A power supply for first and second standby loads, said first standby load being a memory for data retention, which requires energization for a substantial time period following a power loss;

a voltage regulator having an input coupled to a source of input power, and an output coupled to the control terminal of first and second regulating transistors;

the output terminal of said first regulating transistor coupled to said first standby load, and the output terminal of said second regulating transistor coupled to said second standby load; and a storage capacitor coupled through a resistance to the output terminal of said first regulating transistor.

2. A power supply as defined by claim 1, in which said voltage regulator is a feedback type of voltage regulator.

3. A power supply as defined by claim 2, in which the feedback fed to said voltage regulator is taken from the output terminal of said second transistor.

* * * * *